United States Patent
Zhang et al.

(10) Patent No.: US 12,204,015 B1
(45) Date of Patent: Jan. 21, 2025

(54) ESTIMATION METHOD AND SYSTEM FOR QUASI-REAL-TIME MONITORING OF MOVING VELOCITY VECTOR OF TYPHOON BASED ON SYNTHETIC APERTURE RADAR

(71) Applicant: NUIST, Jiangsu (CN)

(72) Inventors: Guosheng Zhang, Jiangsu (CN); Yuanben Li, Jiangsu (CN)

(73) Assignee: NUIST, Jiangsu (CN)

( * ) Notice: Subject to any disclaimer, the term of this patent is extended or adjusted under 35 U.S.C. 154(b) by 0 days.

(21) Appl. No.: 18/819,778

(22) Filed: Aug. 29, 2024

(30) Foreign Application Priority Data

Apr. 7, 2024 (CN) .......................... 202410406479.2

(51) Int. Cl.
| | | |
|---|---|---|
| G01S 13/58 | (2006.01) | |
| G01S 13/62 | (2006.01) | |
| G01S 13/90 | (2006.01) | |
| G01S 13/95 | (2006.01) | |

(52) U.S. Cl.
CPC ............ G01S 13/589 (2013.01); G01S 13/62 (2013.01); G01S 13/90 (2013.01); G01S 13/95 (2013.01)

(58) Field of Classification Search
CPC ........ G01S 13/589; G01S 13/62; G01S 13/90; G01S 13/95; G01S 13/958
See application file for complete search history.

(56) References Cited

U.S. PATENT DOCUMENTS

| | | | |
|---|---|---|---|
| 6,480,142 B1 * | 11/2002 | Rubin .................. | G01S 13/951 |
| | | | 342/134 |
| 9,851,441 B2 * | 12/2017 | Lee ......................... | G01S 13/18 |
| 10,914,865 B1 * | 2/2021 | Fendell .................... | G01W 1/02 |
| 11,719,809 B1 * | 8/2023 | Maschhoff ............ | G01S 13/347 |
| | | | 342/25 A |
| 11,828,903 B2 * | 11/2023 | Fitzpatrick .............. | G06F 30/28 |
| 2010/0026565 A1 * | 2/2010 | Lee ....................... | G01S 13/951 |
| | | | 342/26 R |
| 2020/0150268 A1 * | 5/2020 | Maschhoff ............ | G01S 13/955 |

(Continued)

OTHER PUBLICATIONS

Chinese Office Action for application No. 202410406479.2 dated May 9, 2024 with English translation, 11 pages.

(Continued)

*Primary Examiner* — Peter M Bythrow
(74) *Attorney, Agent, or Firm* — Carter, DeLuca & Farrell LLP

(57) ABSTRACT

An estimation method and system for quasi-real-time monitoring of a moving velocity vector of a typhoon based on a synthetic aperture radar includes: (1) determining, using a threshold method, a position of a typhoon eye wall of a synthetic aperture radar (SAR) sea surface wind field of a typhoon; (2) extracting a final typhoon eye region using a maximum gradient method according to the position of the typhoon eye wall, and estimating an approximate ellipse of the typhoon eye wall and determining a center of the approximate ellipse as a typhoon center; (3) estimating large-scale background wind vector information using the estimated typhoon center and approximate ellipse; and (4) determining a moving velocity vector of the typhoon using the estimated background wind vector information and typhoon center.

2 Claims, 4 Drawing Sheets

(56) References Cited

U.S. PATENT DOCUMENTS

2020/0319335 A1* 10/2020 Cornell ..................... G01S 7/04
2022/0018991 A1*  1/2022 Kim ........................ G01S 13/95

OTHER PUBLICATIONS

Notification to Grant Patent Right for Invention issued by The State Intellectual Property Office of People's Republic of China for application No. 202410406479.2 dated May 23, 2024 with English translation, 3 pages.

* cited by examiner

ESTIMATION METHOD AND SYSTEM FOR QUASI-REAL-TIME MONITORING OF MOVING VELOCITY VECTOR OF TYPHOON BASED ON SYNTHETIC APERTURE RADAR

CROSS REFERENCE TO RELATED APPLICATION

This patent application claims the benefit and priority of Chinese Patent Application No. 202410406479.2, filed with the China National Intellectual Property Administration on Apr. 7, 2024, the disclosure of which is incorporated by reference herein in its entirety as part of the present application.

TECHNICAL FIELD

The present disclosure relates to the fields of the marine remote sensing monitoring technology and the typhoon forecast technology, and in particular, to an estimation method and system for quasi-real-time monitoring of a moving velocity vector of a typhoon based on a synthetic aperture radar.

BACKGROUND

Typhoon position and path monitoring lays a foundation for typhoon (or hurricane) observational studies, and is of great significance for typhoon forecast, and prevention and reduction of natural disasters.

Remote sensing observation has the advantages of a high frequency, wide time and space ranges, and good real-time performance, and is one of powerful means for typhoon path monitoring. Compared with passive remote sensing that mainly uses visible (Vis) or infrared (IR) wave band, microwave remote sensing can provide full-time and full-weather observation and may be less affected by an atmospheric window. A synthetic aperture radar (SAR) is high in resolution, can allow for accurate inversion of surface wind field information of typhoon, and can solve the problem of wind speed saturation in different polarization modes, and thus is of great significance in the typhoon monitoring and forecast field. The SAR is mainly to acquire a normalized radar backscatter cross section (NRCS) by Bragg resonance of electromagnetic waves and capillary-gravity waves of the sea surface, and the NRCS is sensitive to a change in sea surface roughness caused by wind at 10 m over the sea surface. For a typhoon, a typhoon eye region corresponds to the calm sea surface and is surrounded by a typhoon eye wall at a highest wind speed. Therefore, there is a discontinuity in wind speed value in the vicinity of the eye wall, i.e., a meridional gradient maximum of the wind speed. Based on the above typhoon characteristics, a parameterized model and the technique of the present disclosure may be utilized to perform quasi-real-time estimation on a moving velocity vector of a typhoon. Accordingly, quasi-real-time monitoring and forecast of a typhoon path can be realized so that life and economic losses caused by the typhoon can be greatly reduced.

In recent years, with the increasing of SAR satellites, it is possible to realize multi-source SAR satellite cooperative observation of a sea surface wind field of a typhoon. Multi-times high-accuracy comprehensive observation can be further performed on the typhoon by SAR satellite networking or multi-source satellite networking.

SUMMARY

An objective of the present disclosure is to provide an estimation method and system for quasi-real-time monitoring of a moving velocity vector of a typhoon based on a synthetic aperture radar to forecast a typhoon path or a landing region.

The present disclosure adopts the following technical solutions: an estimation method for quasi-real-time monitoring of a moving velocity vector of a typhoon based on a synthetic aperture radar includes the following steps:
(1) determining, using a threshold method, a position of a typhoon eye wall of a synthetic aperture radar (SAR) sea surface wind field of a typhoon;
(2) extracting a final typhoon eye region using a maximum gradient method according to the position of the eye wall, and estimating an approximate ellipse of the typhoon eye wall and determining a center of the approximate ellipse as a typhoon center, where the approximate ellipse is obtained as follows: plotting an ellipse based on the typhoon center that has a same area with an area of the typhoon eye region, and changing an azimuth angle, a major axis length, and a minor axis length to obtain an ellipse having a maximum overlapping area with the typhoon eye region;
(3) estimating large-scale background wind vector information using the estimated typhoon center and approximate ellipse; and
(4) determining a moving velocity vector of the typhoon using the estimated background wind vector information and typhoon center.

Further, step (1) may include: determining the position of the typhoon eye wall with a suitable threshold in the SAR wind field as an initial threshold, extracting a region within the eye wall as an initial typhoon eye region, and estimating an initial typhoon center, where the suitable threshold is 90% of a maximum wind speed in the wind field; and the initial typhoon center is mean values of longitudes and latitudes of all points within the initial typhoon eye region.

Further, step (2) may include: emanating rays from the estimated typhoon center in 360 degrees at intervals of 1 degree and calculating a gradient maximum; and with a mean value of pixel wind speed values at 360 gradient maximums as a new threshold, extracting the final typhoon eye region and a position of the typhoon center.

Further, step (3) may involve the following formula:

$$\vec{U}(r,\theta) = U_{max} \cdot f(R) + A \cdot \vec{V_m};$$

where $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model.

Further, step (4) may involve the following formula:

$$\vec{V_m} = \frac{\vec{U}(r,\theta) - U_{max} \cdot f(R)}{A};$$

where U(r,θ) represents a sea surface wind field obtained by SAR inversion; and f(R) and $U_{max}$ represent typhoon wind fields simulated by the parameterized model function.

An estimation system for quasi-real-time monitoring of a moving velocity vector of a typhoon based on a synthetic aperture radar in the present disclosure includes:

a typhoon eye wall module configured to determine, using a threshold method, a position of a typhoon eye wall of a synthetic aperture radar (SAR) sea surface wind field of a typhoon;

a typhoon center module configured to extract a final typhoon eye region using a maximum gradient method according to the position of the typhoon eye wall, and estimate an approximate ellipse of the typhoon eye wall and determine a center of the approximate ellipse as a typhoon center;

a wind vector information module configured to estimate large-scale background wind vector information using the estimated typhoon center and approximate ellipse, where the approximate ellipse is obtained as follows: plotting an ellipse based on the typhoon center that has a same area with an area of the typhoon eye region, and changing an azimuth angle, a major axis length, and a minor axis length to obtain an ellipse having a maximum overlapping area with the typhoon eye region; and a moving velocity vector module configured to determine a moving velocity vector of the typhoon using the estimated background wind vector information and typhoon center.

Further, the typhoon eye wall module may be further configured to determine the position of the typhoon eye wall with a suitable threshold in the SAR wind field as an initial threshold, extract a region within the eye wall as an initial typhoon eye region, and estimate an initial typhoon center, where the suitable threshold is 90% of a maximum wind speed in the wind field; and the initial typhoon center is mean values of longitudes and latitudes of all points within the initial typhoon eye region.

Further, the typhoon center module may be further configured to emanate rays from the estimated typhoon center in 360 degrees at intervals of 1 degree and calculate a gradient maximum, and with a mean value of pixel wind speed values at 360 gradient maximums as a new threshold, extract the final typhoon eye region and a position of the typhoon center.

Further, the wind vector information module may involve the following formula:

$$\vec{U}(r,\theta) = U_{max} \cdot f(R) + A \cdot \vec{V_m};$$

where $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model.

Further, the moving velocity vector module may involve the following formula:

$$\vec{V_m} = \frac{\vec{U}(r,\theta) - U_{max} \cdot f(R)}{A};$$

where $\vec{U}(r,\theta)$ represents a sea surface wind field obtained by SAR inversion; and f(R) and $U_{max}$ represent typhoon wind fields simulated by the parameterized model function.

Beneficial effects: compared with the prior art, the present disclosure has the following significant advantages: the moving velocity vector information of a typhoon is extracted in real time and the position of a center of the typhoon or hurricane can be determined. This is conducive to determining a possible path of the typhoon, i.e., a moving velocity and a moving direction of the typhoon or hurricane, which facilitates quasi-real-time forecast of the typhoon or hurricane. Meanwhile, according to the present disclosure, different SAR satellites are connected in series to monitor a sea surface wind field, and quasi-real-time extraction of the moving velocity vector of the typhoon can be realized, thereby facilitating typhoon path monitoring and forecast and intelligent networking use of multi-source SAR satellites.

DETAILED DESCRIPTION OF THE EMBODIMENTS

The technical solutions of the present disclosure are further described below with reference to the accompanying drawings.

Figure 1A:
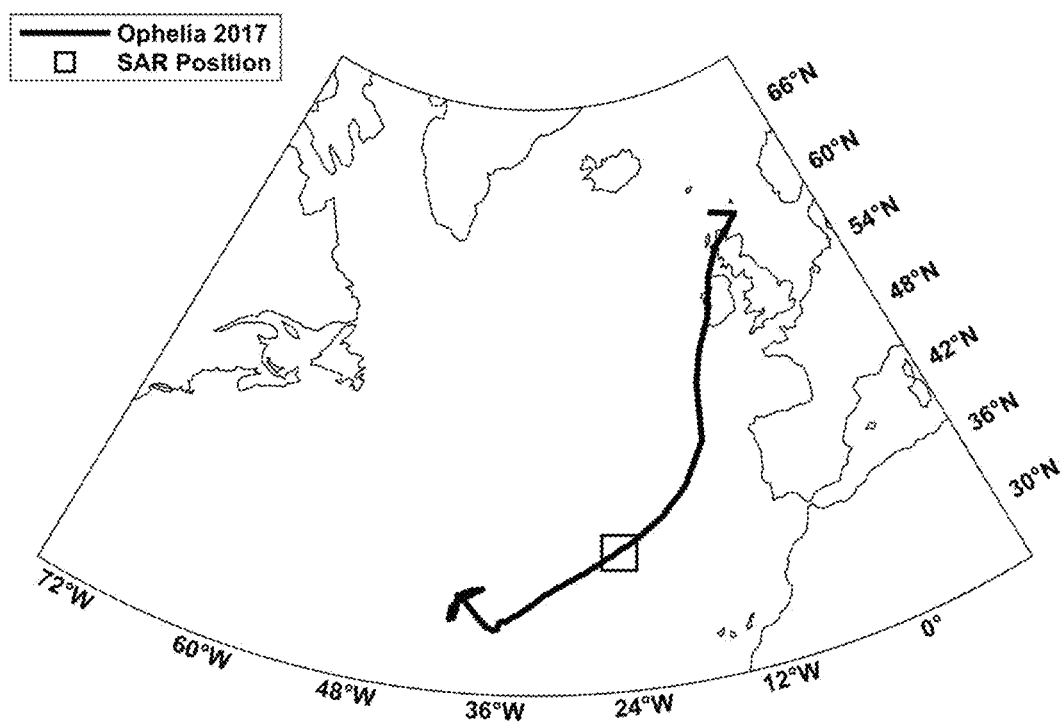
FIGS. 1A-1D are principle diagrams of the present disclosure.
Figure 1B:
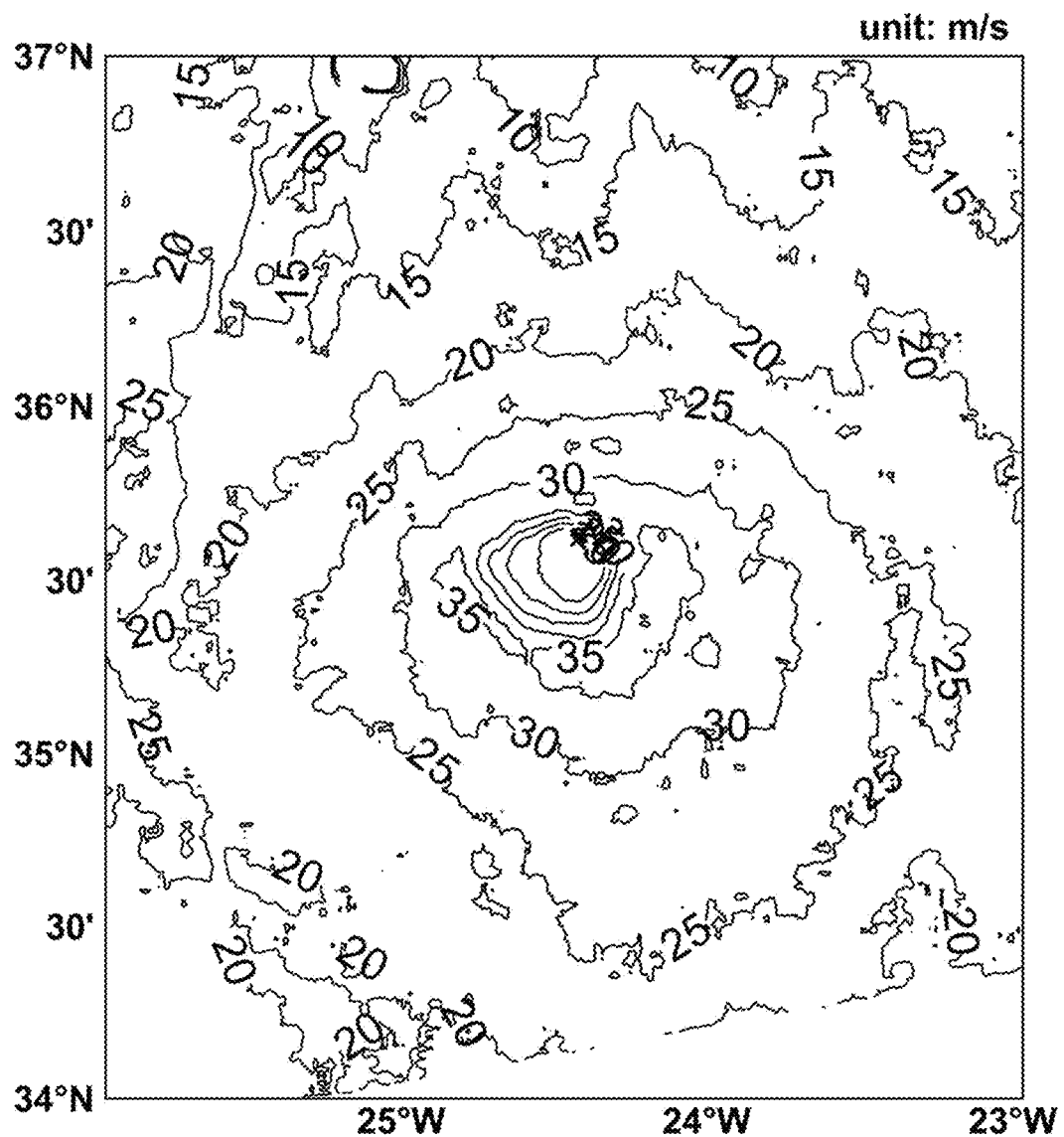
Figure 1C:
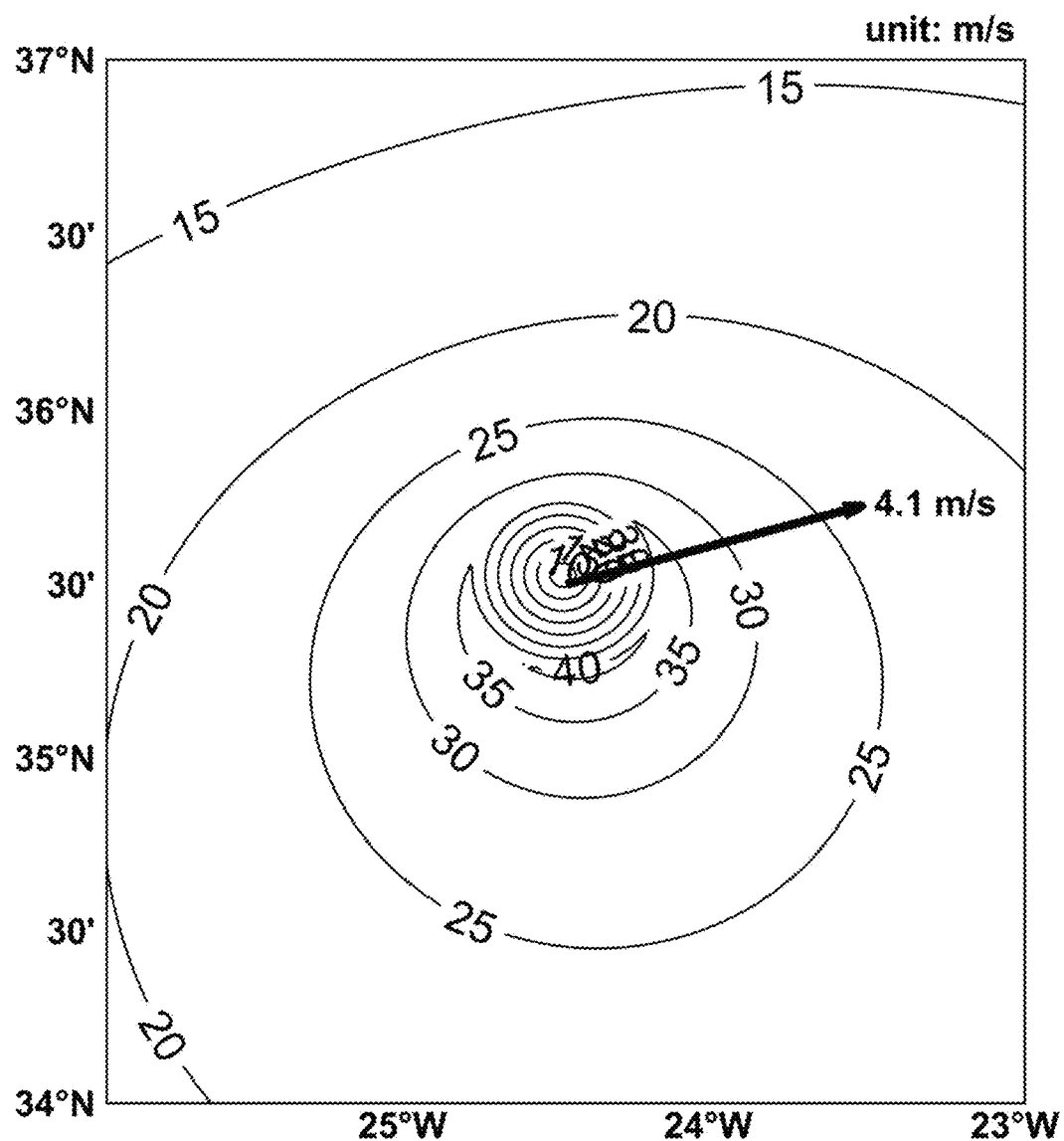
Figure 1D:
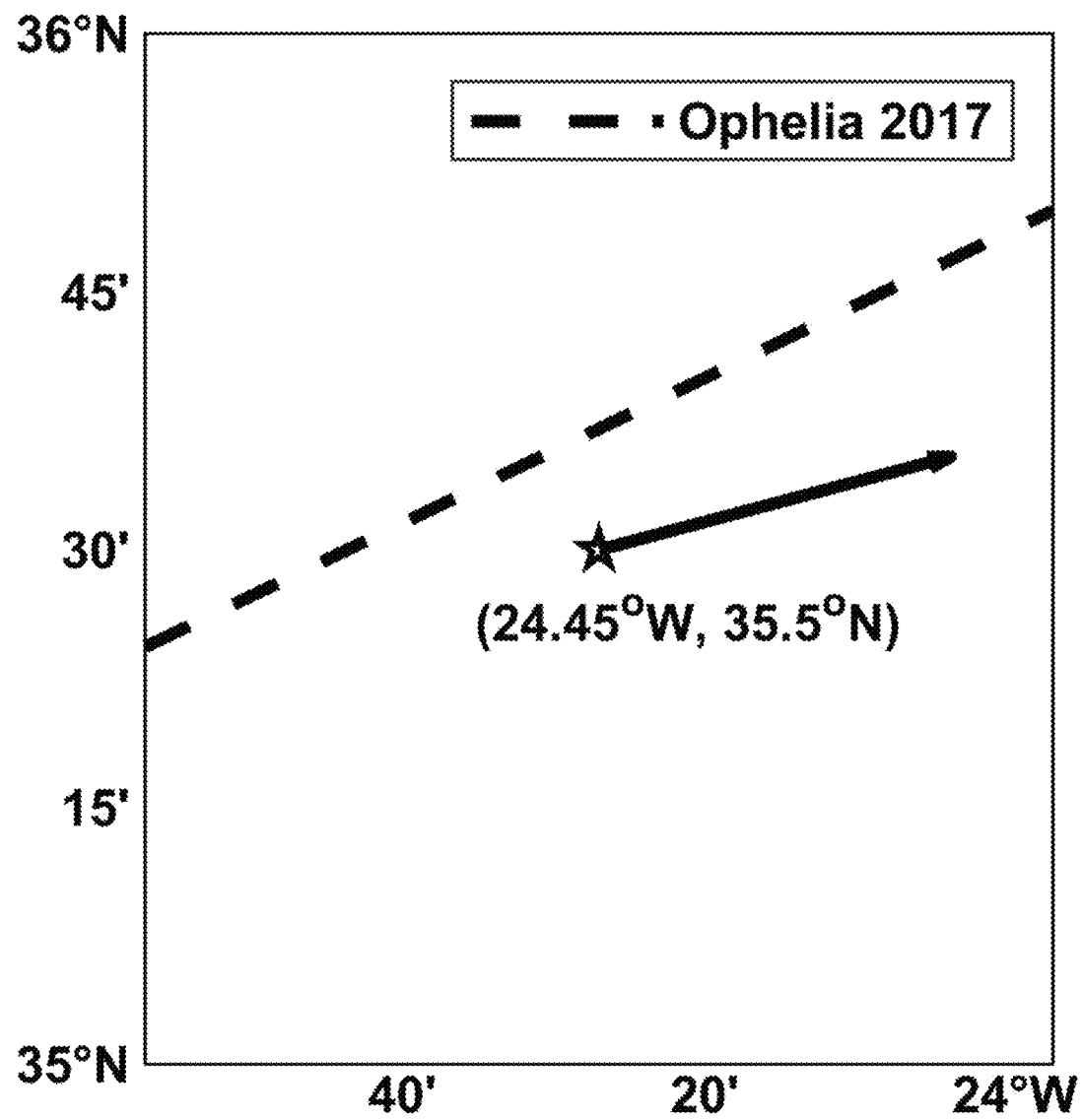

As shown in FIGS. 1A-1D, an embodiment of the present disclosure provides an estimation method for quasi-real-time monitoring of a moving velocity vector of a typhoon based on a synthetic aperture radar, including the following steps.

(1) A position of a typhoon eye wall of a synthetic aperture radar (SAR) sea surface wind field of a typhoon is determined using a threshold method. Specifically, the position of the typhoon eye wall is determined with a suitable threshold in the SAR wind field as an initial threshold, a region within the eye wall is extracted as an initial typhoon eye region, and an initial typhoon center is estimated, where the suitable threshold is 90% of a maximum wind speed in the wind field; and the initial typhoon center is mean values of longitudes and latitudes of all points within the initial typhoon eye region.

(2) A final typhoon eye region is extracted using a maximum gradient method according to the position of the eye wall, and an approximate ellipse of the typhoon eye wall is estimated, and a center of the approximate ellipse is determined as a typhoon center, where the approximate ellipse is obtained as follows: plotting an ellipse based on the typhoon center that has a same area with an area of the typhoon eye region, and changing an azimuth angle, a major axis length, and a minor axis length to obtain an ellipse having a maximum overlapping area with the typhoon eye region. Specifically, rays are emanated from the estimated typhoon center in 360 degrees at intervals of 1 degree and a gradient maximum is calculated, and with a mean value of pixel wind speed values at 360 gradient maximums as a new threshold, the final typhoon eye region and a position of the typhoon center are extracted.

(3) Large-scale background wind vector information is estimated using the estimated typhoon center and approximate ellipse, where the following formula is involved:

$$\vec{U}(r,\theta) = U_{max} \cdot f(R) + A \cdot \vec{V_m};$$

where $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model.

(4) A moving velocity vector of the typhoon is determined using the estimated background wind vector information and typhoon center, where the following formula is involved:

$$\vec{V_m} = \frac{\vec{U}(r,\theta) - U_{max} \cdot f(R)}{A};$$

where $\vec{U}(r,\theta)$ represents a sea surface wind field obtained by SAR inversion; and f(R) and $U_{max}$ represent typhoon wind fields simulated by the parameterized model function.

By the method provided in the present disclosure, for a sea surface wind field observation process of an SAR satellite, the position of a center of a typhoon or hurricane can be determined rapidly, thereby being conducive to quasi-real-time determination of a moving vector (i.e., a moving velocity and direction of the typhoon or hurricane) of the typhoon, which facilitates quasi-real-time monitoring and forecast of the typhoon or hurricane. Meanwhile, according to the present disclosure, a plurality of sea surface wind field SAR observation satellites can be connected in series to rapidly extract the typhoon center and the moving velocity vector of the typhoon, which provides feasible technical guarantee for "intelligent networking" of multi-source SAR satellites.

As shown in Table 1, there is provided a simple description of several synthetic aperture radars (SARs), and an SAR image of RADARSAT-2 is selected herein as an example. As shown in FIGS. 1A-1D, the successful extraction of the sea surface wind field of hurricane Ophelia (2017) monitored based on RADARSAT-2 provides feasible technical guarantee for extracting the sea surface wind field information using SAR satellites with different spatial resolutions and realizing "intelligent networking" of multi-source SAR satellites.

As shown in FIGS. 1A-1D, for SAR remote sensing monitoring of a typhoon, the following SAR satellites are mainly employed to monitor the sea surface wind field of a typhoon at present: RADARSAT-2, Sentinel-1A/B, and Gaofen-3 satellites Jan. 2, 2003, etc. Different satellites have respective advantages and lay a foundation for studies on quasi-real-time monitoring of a moving velocity vector of a typhoon using multi-source SAR satellites. The above-mentioned devices are carried on satellites for monitoring.

TABLE 1

Typhoon Observations with Existing SAR Satellites

| Sensor | Major Satellite | Wave Band | Swath | Spatial Resolution | Polarization Mode | Launching Year |
|---|---|---|---|---|---|---|
| Synthetic Aperture Radar (SAR) | RADARSAT-2 | C-Band | 20-500 km | 1-100 m | single/dual/full polarization | 2007 |
| | Sentinel-1A Sentinel-1B | C-Band | 20-400 km | 5-20 m | single/dual polarization | 2014 2016 |
| | Gaofen-3 satellite 01 | C-Band | 10-650 km | 1-500 m | single/dual/full polarization | 2016 |
| | Gaofen-3 satellite 02 | | | | | 2021 |
| | Gaofen-3 satellite 03 | | | | | 2022 |
| | RCM constellation | C-Band | 20-500 km | 3-100 m | single/dual/full polarization | 2019 (three satellites with one rocket) |
| | Hisea-1 | C-Band | 20-500 km | 1-20 m | single polarization | 2020 |

An embodiment of the present disclosure further provides an estimation system for quasi-real-time monitoring of a moving velocity vector of a typhoon based on a synthetic aperture radar, including:

a typhoon eye wall module configured to determine, using a threshold method, a position of a typhoon eye wall of a synthetic aperture radar (SAR) sea surface wind field of a typhoon, which is specifically configured to determine the position of the typhoon eye wall with a suitable threshold in the SAR wind field as an initial threshold, extract a region within the eye wall as an initial typhoon eye region, and estimate an initial typhoon center, where the suitable threshold is 90% of a maximum wind speed in the wind field; and the initial typhoon center is mean values of longitudes and latitudes of all points within the initial typhoon eye region;

a typhoon center module configured to extract a final typhoon eye region using a maximum gradient method according to the position of the typhoon eye wall, and estimate an approximate ellipse of the typhoon eye wall and determine a center of the approximate ellipse as a typhoon center, which is specifically configured to emanate rays from the estimated typhoon center in 360 degrees at intervals of 1 degree and calculate a gradient maximum, and with a mean value of pixel wind speed values at 360 gradient maximums as a new threshold, extract the final typhoon eye region and a position of the typhoon center; where the approximate ellipse is obtained as follows: plotting an ellipse based on the typhoon center that has a same area with an area of the typhoon eye region, and changing an azimuth angle, a major axis length, and a minor axis length to obtain an ellipse having a maximum overlapping area with the typhoon eye region; and a wind vector information module configured to estimate large-scale background wind vector information using the estimated typhoon center and approximate ellipse, where the following formula is involved:

$$\vec{U}(r,\theta)=U_{max}\cdot f(R)+A\cdot \vec{V_m};$$

where $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model.

a moving velocity vector module configured to determine a moving velocity vector of the typhoon using the estimated background wind vector information and typhoon center. The formula is involved:

$$\vec{V_m} = \frac{\vec{U}(r,\theta) - U_{max}\cdot f(R)}{A};$$

where $\vec{U}(r,\theta)$ represents a sea surface wind field obtained by SAR inversion; and f(R) and $U_{max}$ represent typhoon wind fields simulated by the parameterized model function.

What is claimed is:

1. An estimation method for quasi-real-time monitoring of a moving velocity vector of a typhoon based on a synthetic aperture radar, comprising the following steps:
   (1) determining, using a threshold method, a position of a typhoon eye wall of a synthetic aperture radar (SAR) sea surface wind field of a typhoon, wherein step (1) specifically comprises: determining the position of the typhoon eye wall with a suitable threshold in the SAR wind field as an initial threshold, extracting a region within the typhoon eye wall as an initial typhoon eye region, and estimating an initial typhoon center, wherein the suitable threshold is 90% of a maximum wind speed in the wind field; and the initial typhoon center is mean values of longitudes and latitudes of all points within the initial typhoon eye region;
   (2) extracting a final typhoon eye region using a maximum gradient method according to the position of the typhoon eye wall, and estimating an approximate ellipse of the typhoon eye wall and determining a center of the approximate ellipse as a typhoon center, wherein step (2) specifically comprises: emanating rays from the estimated typhoon center in 360 degrees at intervals of 1 degree and calculating a gradient maximum; and with a mean value of pixel wind speed values at 360 gradient maximums as a new threshold, extracting the final typhoon eye region and a position of the typhoon center;
   (3) estimating large-scale background wind vector information using the estimated typhoon center and approximate ellipse according to the following formula:

$$\vec{U}(r,\theta)=U_{max}\cdot f(R)+A\cdot \vec{V_m};$$

wherein $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model; and (4) determining a moving velocity vector of the typhoon using the estimated background wind vector information and typhoon center according to the following formula:

$$\vec{V_m} = \frac{\vec{U}(r,\theta) - U_{max}\cdot f(R)}{A};$$

wherein $\vec{U}(r,\theta)$ represents a sea surface wind field obtained by SAR inversion; and f(R) and $U_{max}$ represent typhoon wind fields simulated by the parameterized model function.

2. An estimation system for quasi-real-time monitoring of a moving velocity vector of a typhoon based on a synthetic aperture radar, comprising:
   a typhoon eye wall module configured to determine, using a threshold method, a position of a typhoon eye wall of a synthetic aperture radar (SAR) sea surface wind field of a typhoon, wherein the typhoon eye wall module is further configured to determine the position of the typhoon eye wall with a suitable threshold in the SAR wind field as an initial threshold, extract a region within the typhoon eye wall as an initial typhoon eye region, and estimate an initial typhoon center, wherein the suitable threshold is 90% of a maximum wind speed in the wind field; and the initial typhoon center is mean values of longitudes and latitudes of all points within the initial typhoon eye region;
   a typhoon center module configured to extract a final typhoon eye region using a maximum gradient method according to the position of the typhoon eye wall, and estimate an approximate ellipse of the typhoon eye wall and determine a center of the approximate ellipse as a typhoon center, wherein the typhoon center module is configured to emanate rays from the estimated typhoon center in 360 degrees at intervals of 1 degree and calculate a gradient maximum, and with a mean value of pixel wind speed values at 360 gradient maximums as a new threshold, extract the final typhoon eye region and a position of the typhoon center;
   a wind vector information module configured to estimate large-scale background wind vector information using the estimated typhoon center and approximate ellipse according to the following formula:

$$\vec{U}(r,\theta) = U_{max} \cdot f(R) + A \cdot \vec{V_m};$$

wherein $\vec{U}$ represents a wind speed at an elevation of 10 m over a sea surface, in unit of m/s; $U_{max}$ represents a maximum sea surface wind speed of the typhoon, namely a typhoon intensity, in unit of m/s; R represents a distance of a certain point to the typhoon center, in unit of km; $\vec{V_m}$ represents the moving velocity vector of the typhoon, which is an idealized parameter and related to sea surface friction, with a value of 0.5; and f(R) represents a parameterized model function of a distance to the typhoon center, which is Holland or Rankine model; and a moving velocity vector module configured to determine a moving velocity vector of the typhoon using the estimated background wind vector information and typhoon center according to the following formula:

$$\vec{V_m} = \frac{\vec{U}(r,\theta) - U_{max} \cdot f(R)}{A};$$

wherein $\vec{U}(r,\theta)$ represents a sea surface wind field obtained by SAR inversion; and f(R) and $U_{max}$ represent typhoon wind fields simulated by the parameterized model function.

* * * * *